US010896193B2

(12) United States Patent
Dwivedi et al.

(10) Patent No.: US 10,896,193 B2
(45) Date of Patent: Jan. 19, 2021

(54) CACHE FETCHING OF OLAP BASED DATA USING CLIENT TO CLIENT RELATIONSHIPS AND DATA ENCODING

(71) Applicant: International Business Machines Corporation, Armonk, NY (US)

(72) Inventors: Saurabh Dwivedi, Delhi (IN); Rahul Parashar, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 384 days.

(21) Appl. No.: 15/782,891

(22) Filed: Oct. 13, 2017

(65) Prior Publication Data

US 2019/0114349 A1  Apr. 18, 2019

(51) Int. Cl.
  *G06F 16/185* (2019.01)
  *G06F 16/25* (2019.01)
  *G06F 16/2455* (2019.01)

(52) U.S. Cl.
  CPC ...... *G06F 16/254* (2019.01); *G06F 16/24552* (2019.01)

(58) Field of Classification Search
  None
  See application file for complete search history.

(56) References Cited

U.S. PATENT DOCUMENTS

| 2002/0066026 A1 | 5/2002 | Yau et al. | |
| 2011/0066675 A1* | 3/2011 | Klawinski | G06F 16/29 709/203 |
| 2013/0318034 A1* | 11/2013 | Bawa | G06F 16/283 707/602 |
| 2014/0254675 A1* | 9/2014 | Lee | H04N 19/593 375/240.12 |
| 2015/0106325 A1 | 4/2015 | Cole et al. | |
| 2016/0087933 A1* | 3/2016 | Johnson | H04W 4/70 709/245 |
| 2016/0098471 A1 | 4/2016 | Weidner et al. | |

FOREIGN PATENT DOCUMENTS

CA  2686299 A1  5/2011

OTHER PUBLICATIONS

Peter Mell, et al, "The NIST Definition of Cloud Computing" NIST, Special Publication 800-145, 2011, 7 pages.

* cited by examiner

*Primary Examiner* — Tuankhanh D Phan
(74) *Attorney, Agent, or Firm* — Cantor Colburn LLP; Richard Wilhelm

(57) ABSTRACT

Embodiments include techniques for implementing cache fetching of online analytical processing (OLAP) based data using client to client relationships and data encoding, where the techniques include assigning codes for each dimension of a data cube, and determining a client stores data corresponding to the data cube based on a client ID, wherein the client ID indicates the client stores the data. The techniques also include transmitting a request to the determined client for the data, wherein the request includes one or more assigned codes for the data, and receiving and storing the data.

15 Claims, 8 Drawing Sheets

800

| Concatenated Code | Data |
|---|---|
| A1B0C0 | 456.67 |
| A2B0C0 | 234.54 |

400

| Cubename | Page 1 | Page 2 | ... | Page n | Server hash Table ID | Client ID |
|---|---|---|---|---|---|---|
| Cube 1 | P1 | P2 | ... | Pn | 0001 | Client 1 |
| Cube 1 | P1 | P3 | ... | Pn1 | 0002 | Client 2 |
| Cube 2 | P1 | P2 | ... | Pn | 0003 | - |
| ... | ... | ... | ... | ... | ... | Client 8 |

| Server Hash Table ID | View Pointer |
|---|---|
| 0001 | 0x987645 |
| 0002 | 0x678430 |

| Month Name | Alphanumeric Code |
|---|---|
| January | A0 |
| February | A1 |
| March | A2 |
| ... | ... |

602

| Product Name | Alphanumeric Code |
|---|---|
| Xenophine Betex | B0 |
| Zolomex Petadine | B1 |
| ... | ... |

604

| Account Name | Alphanumeric Code |
|---|---|
| Account 12345 | C0 |
| Account 45787 | C1 |
| ... | ... |

| Concatenated Code | Short Code | Definition |
|---|---|---|
| A1B0C0 | Z0 | Data for account 1 Xenophine Betex March |
| ... | ... | |

| Concatenated Code | Data |
|---|---|
| A1B0C0 | 456.67 |
| A2B0C0 | 234.54 |

FIG. 8

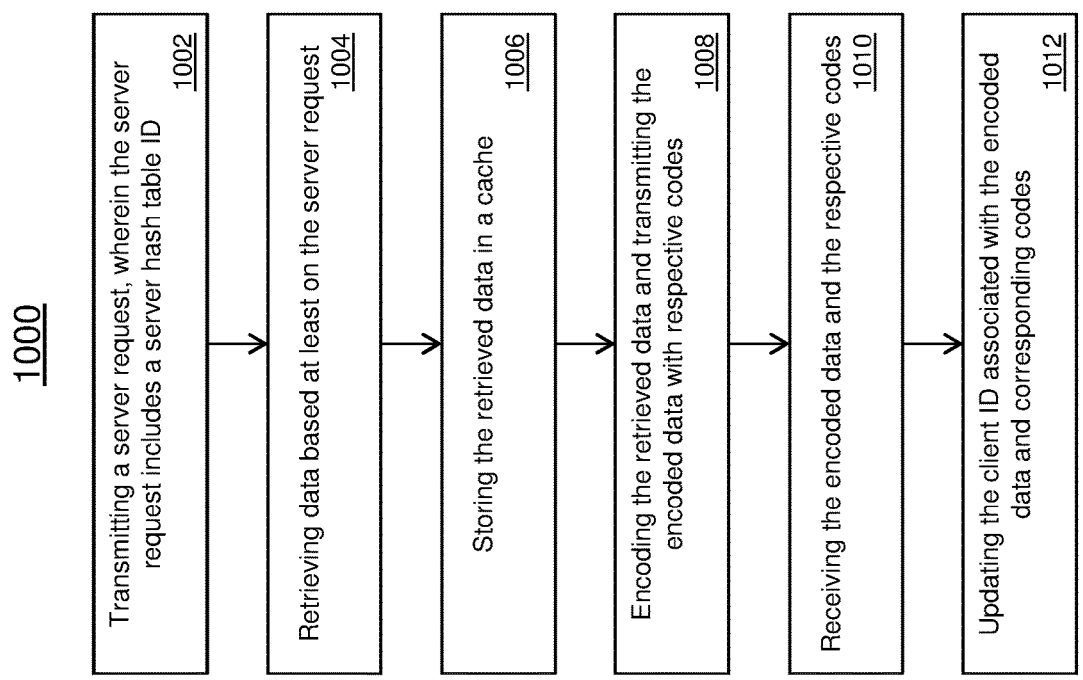

CACHE FETCHING OF OLAP BASED DATA USING CLIENT TO CLIENT RELATIONSHIPS AND DATA ENCODING

BACKGROUND

The present invention generally relates to caching data, and more specifically, to cache fetching of online analytical processing (OLAP) based data using client to client relationships and data encoding.

Online analytical processing (OLAP) is used for representing multidimensional data associated with databases or data marts. Servers can be configured with OLAP engines to process the vast amount of data stored in a large database. Servers and clients can generate OLAP queries to obtain various combinations of information. OLAP cubes can be generated to organize the stored data in a manner that allows for complex analytical and ad hoc queries with a rapid execution time. The OLAP cubes are organized based on the dimensions. Also, data cubes can have more than three dimensions and are referred to as hypercubes. The cells of the cubes store data the represents some measure such as budget or sales data. This information can be returned to a user responsive to a request.

SUMMARY

Embodiments of the present invention are directed to a computer-implemented method for cache fetching in OLAP based data using client to client relationships and data encoding. A non-limiting example of the computer-implemented method includes assigning codes for each dimension of a data cube, and determining a client stores data corresponding to the data cube based on a client ID, wherein the client ID indicates the client stores the data. The methods also include transmitting a request to the determined client for the data, wherein the request includes one or more assigned codes for the data, and receiving and storing the data.

Embodiments of the present invention are directed to a system for cache fetching in OLAP based data using client to client relationships and data encoding. A non-limiting example of the system includes a processor configured to assign codes for each dimension of a data cube, and determine a client stores data corresponding to the data cube based on a client ID, wherein the client ID indicates the client stores the data. The processor is also configured to transmit a request to the determined client for the data, wherein the request includes one or more assigned codes for the data, and receive and storing the data.

Embodiments of the invention are directed to a computer program product for cache fetching in OLAP based data using client to client relationships and data encoding, the computer program product comprising a computer readable storage medium having program instructions embodied therewith. The program instructions are executable by a processor to cause the processor to perform a method. A non-limiting example of the method includes assigning codes for each dimension of a data cube, and determining a client stores data corresponding to the data cube based on a client ID, wherein the client ID indicates the client stores the data. The methods also include transmitting a request to the determined client for the data, wherein the request includes one or more assigned codes for the data, and receiving and storing the data.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 4 depicts a mapping table for cache fetching OLAP based data using client to client relationships and data encoding in accordance with one or more embodiments is shown;

FIG. 5 depicts a server hash table for cache fetching OLAP based data using client to client relationships and data encoding in accordance with one or more embodiments is shown;

FIG. 6 depicts codes for dimensional elements for cache fetching OLAP based data using client to client relationships and data encoding in accordance with one or more embodiments is shown;

FIG. 7 depicts frequently use table for cache fetching OLAP based data using client to client relationships and data encoding in accordance with one or more embodiments is shown;

FIG. 8 depicts a table for cache fetching OLAP based data using client to client relationships and data encoding in accordance with one or more embodiments is shown;

FIG. 10 depicts another flow chart for cache fetching OLAP based data using client to client relationships and data encoding in accordance with one or more embodiments is shown.

Figure 1:
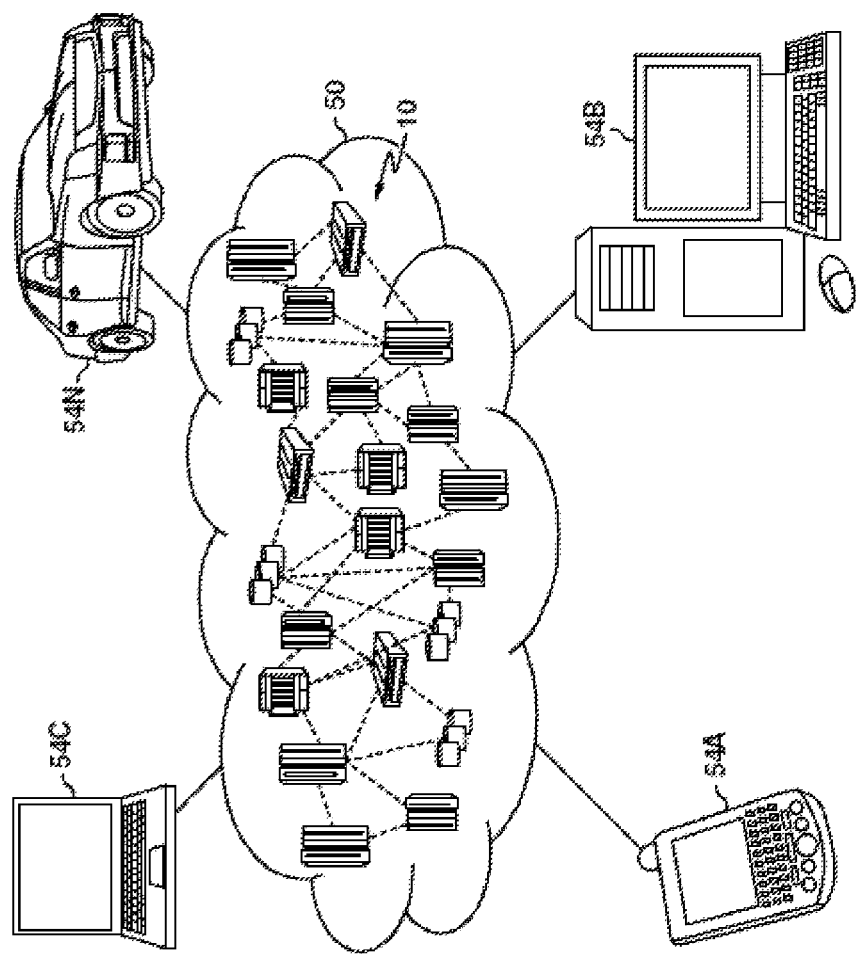
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
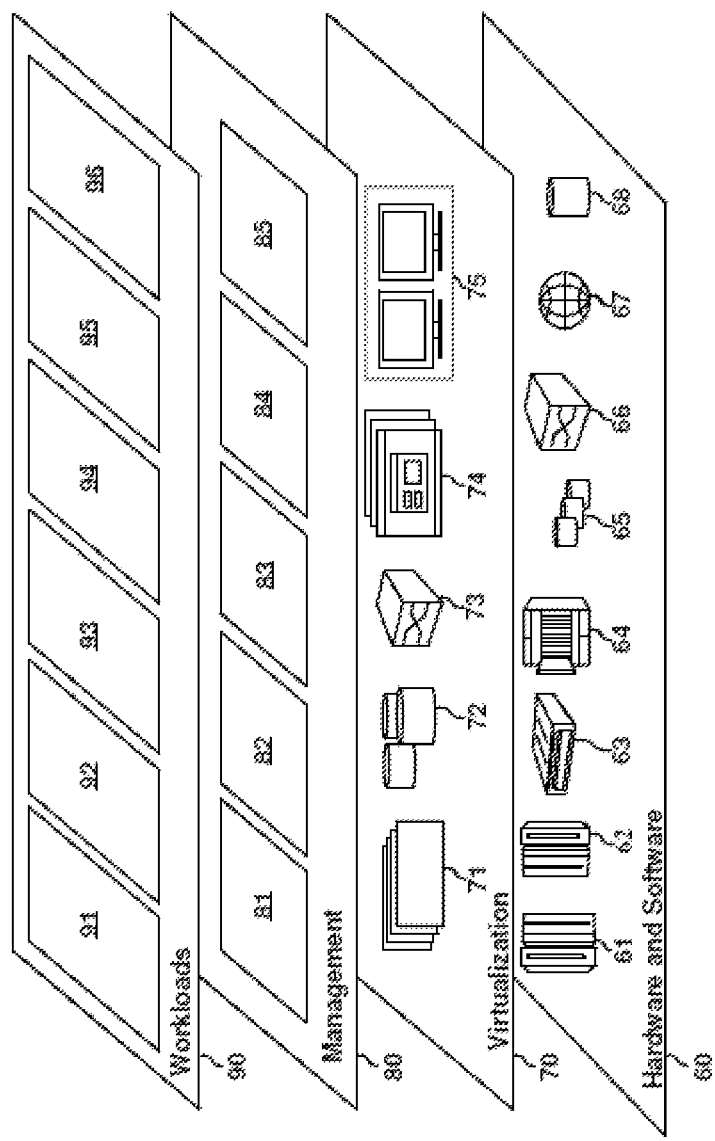
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and action analytics and notifications 96.

Figure 3:
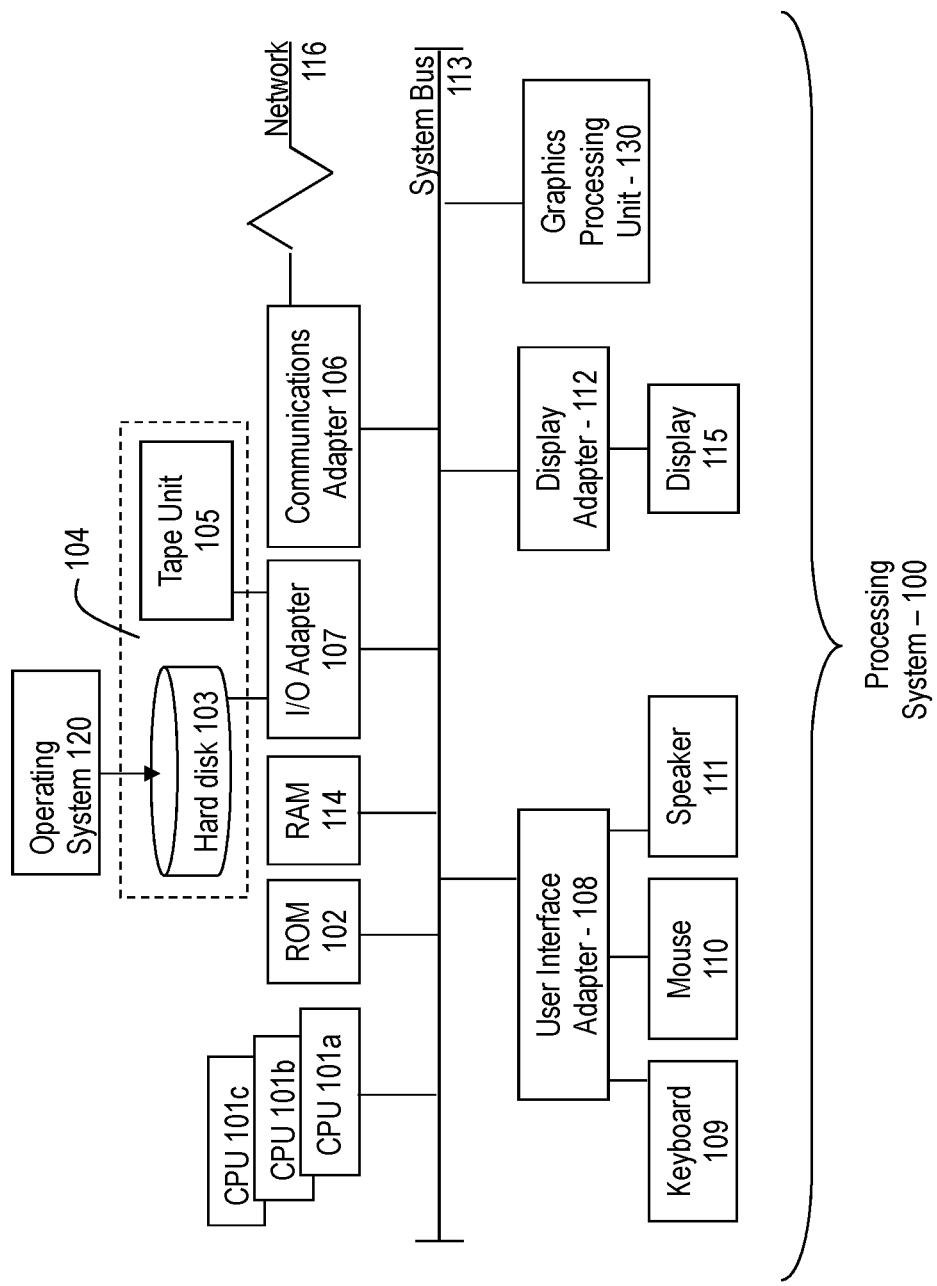
FIG. 3 depicts a block diagram illustrating one example of a processing system for practice of the teachings herein.

Referring to FIG. 3, there is shown an embodiment of a processing system 100 for implementing the teachings herein. In this embodiment, the system 100 has one or more central processing units (processors) 101a, 101b, 101c, etc. (collectively or generically referred to as processor(s) 101). In one or more embodiments, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 3 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing and has a highly parallel structure that makes it more effective than general-purpose CPUs for algorithms where processing of large blocks of data is done in parallel.

Thus, as configured in FIG. 3, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system coordinate the functions of the various components shown in FIG. 3.

Turning now to an overview of technologies that are more specifically relevant to aspects of the invention, where online analytical processing (OLAP) cubes are used to store data associated with a multi-dimensional array of data. Each dimension of the cube can describe a category/classification of information. In OLAP based systems, the servers are configured with a cache to store frequently and recently used data. Further, in OLAP based systems, the key belongs to the pointers of the metadata such as dimensions and the value belongs to the corresponding view that contains cells against the metadata of rows, columns, and pages. The dimensional elements of the data cube take up a large amount of data and being able to code this information reduces the space required to store the information.

Accessing the OLAP data includes a process of fetching the data. The process begins as a user selects required page items, rows, and columns of information stored in the data cube. The user then requests the data against the combination of the selection. Upon receiving the request, the server checks its cache to determine if the data exists in the cache.

In the event the data is not present in the cache, the server fetches the data from the database or data cube, such as an OLAP cube. The fetched data can be combined with data that is currently present in the cache prior to returning the requested data to the user. The cache can be updated to store the newly fetched data for future use.

OLAP tools process and return vast amounts of data, efficient data transmission needs to be conducted in a cost effective manner. As the number of user increase efficient data transmission becomes even more critical. In addition, clients' Internet connectivity may be optimized for the transmission of large amounts of data, so in the event that OLAP applications are used, the techniques described herein can reduce the transmission cost of the requested data.

Given that clients of a company are likely part of the same network, client-to-client data can be efficiently exchanged over the network. These networks can include WiFi networks and/or Bluetooth networks. Therefore, peer-to-peer transmission of data between clients over Bluetooth or WiFi becomes more cost effective than initially requesting data from the centralized server. It is to be understood that other types of networks can be used.

Turning now to an overview of the aspects of the invention, one or more embodiments of the invention address the above-described shortcomings of the prior art by providing a technique to reduce the data transfer between client and server and further allow client to client data transmission.

The dimensional elements that are stored in the data cube take up a large amount of memory space. Alphanumeric numbers can be used to provide codes which utilize a smaller amount of space compared to storing the dimensional elements which tend to take up a lot of overhead. The techniques described herein allow for a reduction in the amount of data that is transferred by coding the dimensional elements of the data cube and further provides a technique for clients to obtain data from other client storing the request data.

Data cubes can be used to store data for large projects. For example, large projects can include several modules where each of the modules can be associated or grouped with various departments. In an example, a company can have several departments and may wish to summarize some financial data by product, by time-period, and by city to compare actual and budget expensed. These three labels are the data's dimensions. In another example, the dimensions include the month, products, and accounts. In other examples, one or more dimensions can be used. For this reason, when clients or users in a department fetch the OLAP data, similar queries may be repeatedly requested from clients and users in the same department. The finance department users may be interested in company financials and their breakup and detailed working. The human resources (HR) department users may be interested in workforce related queries. So if earnings before interest, tax, depreciation and amortization (EBITDA) value for a particular business unit is required, chances are that somebody in the finance department has already seen it, requested it, and saved it. So if for a large business it takes 20 minutes to calculate the consolidated value at the group company level, it is much faster and easier to request the same value from the nearby departmental user cache available on some of the colleague's device. The queries that are repeatedly requested can be coded and made accessible to the clients.

The above-described aspects of the invention address the shortcomings of the prior art by leveraging hash tables such departmental hash tables (mapping table) and server hash table, to store coding information for the data requests and client relationship information.

Now referring to FIG. 4, a mapping table 400 for cache fetching OLAP based data using client and data relationships in accordance with one or more embodiments is provided. The mapping table 400 can be stored on one or more servers and/or one or more clients in a network. In one or more embodiments, the mapping table 400 can store a cubename, page information, server hash table ID, and client ID. In one or more embodiments, the mapping table 400 can be associated with one or more departments. For example, each department can be associated with a set of data cubes and a different department can be associated with a different set of data cubes, where the data cubes can overlap or completely distinct. In other embodiments, the mapping table can store other information associated with the arrangement of data in the data cube.

The mapping table 400 includes cubenames where each cube organizes data stored in a data warehouse or data mart that allows for efficient access to the data. For example, a first cube can be associated with a first department and a second cube can be associated with a different department. In a different example, the first and second cubes may have overlapping data or completely distinct data.

The page information stored in the mapping table 400 can indicate the dimensions, elements, rows, and columns of data arranged in a data cube. The data can be requested by computing nodes based on the page information.

The server hash table identifier (ID) indicates can also be stored in the mapping table 400. The server hash table ID can be used a key in a key-value pair to obtain the value stored against the key. The cube represents a multidimensional array of values used to store data, where each dimension represents an attribute that is stored in a database and the cells in the cube represent the measure/value of interest. In one or more embodiments, a server request can be transmitted from a client or computing node directly to a server using the server hash table ID. Responsive to receiving the request the server can index the server hash table ID into a server hash table to obtain a pointer to the information associated with the server request. After the server obtains the data, the server can encode the data and provide a code for each piece of corresponding data. The server can then return the data that is referenced by the server hash table ID.

The mapping table 400 can also store a client ID which indicates a client that possesses the associated data, if such a client exists. For example, the mapping table 400 stores client ID for a Client 1, Client 2, Client 8, etc. The client ID is stored in a row corresponding to the cube data. A dash ("-") indicates that no client device currently stores the cube data in the corresponding row. The requesting client can directly receive the data from the client indicated by the client ID. Therefore, processing at the server is reduced because the server is not burdened with providing the requested data that already exists at some client or device in the network.

Now referring to FIG. 5, a server hash table 500 for cache fetching OLAP based data using client and data relationships in accordance with one or more embodiments is provided.

The server hash table 500 can store the server hash table ID and a corresponding pointer. The server hash table ID can be used to index into the server hash table 500 to obtain the corresponding pointer information to obtain data. In one or more embodiments, the pointer can be view pointer information which identifies data that is arranged in a cube. The view pointer provides the data according to a combination of dimensions of the data cube, which can be efficiently accessed and returned to the requesting client.

In one or more embodiments, the mapping tables and hash tables can be stored at a server, client, remote modules, or a combination thereof. In addition, the mapping tables and hash tables can be periodically updated by transmitting update messages between any of the devices such as announcement messages to maintain a current view of the data available in the network.

Now referring to FIG. 6, tables 600 for cache fetching OLAP based data using client and data relationships in accordance with one or more embodiments is provided.

The first table 602 provides a first dimensional element of a data cube. In this example, each month is encoded to a code. In one or more embodiments, the code can be an alphanumeric code. For example, January is mapped to A0, February is mapped to A1, March is mapped to A2, and so on. The second table 604 provides another dimensional element of the data cube which is a product name. In an example, the product Xenophine Betex is mapped to B0, Zolomex Petadine is mapped to B1, and so on. Table 606 provides an additional dimensional element of accounts. For example, the account is mapped to C0, Account 45787 is mapped to C1, and so on.

In an example, the elements from each dimension can be merged or concatenated to form a concatenated code representing the combinations of selected dimensions. In a particular example, A1B0C0 represents the individual dimensions representing the data for Account 1, Xenophine Betex, March.

For each character code, if 26 letters of the alphabet and 10 digits are used, dimensions with 36 elements can be mapped with 1 character, dimension with 1296 (36^2) elements with 2 characters, dimensions 46656 (36^3) with 3 characters, and so on. By using ASCII characters, the number of characters to take for encoding could be increased and the frequency of characters to take for encoding could be further reduced.

Now referring to FIG. 7, a frequently used table 700 for cache fetching OLAP based data using client and data relationships in accordance with one or more embodiments is provided.

In one or more embodiments, the requests for data that are frequently used by clients can be provided in a separate frequently used table 700. The frequently used table 700 includes the concatenated code, short code, and the definition or meaning of the codes. In a non-limiting example, the concatenated code "A1B0C0" is frequently used and mapped to the short code "Z0." In one or more embodiments, the short code is shorter in length than the concatenated code. The codes can be an alphanumeric code or other scheme for providing a code. In one or more embodiments, a concatenated code is determined to be frequently used based on the number times it has been requested by one or more clients. For example, a configurable threshold number of requests can be used to determine whether a set of codes is frequently used. The short codes can be used to request data from other clients.

In other embodiments, different information can be stored in the frequently used table. Also in other embodiments, different variations can be used to implement the frequently used table.

Now referring to FIG. 8, a table 800 for cache fetching OLAP based data using client and data relationships is provided. The table includes the Concatenated Codes and the Data it is mapped to. For example, the first concatenated code "A1B0C0" is mapped to "456.67" and "A2B0C0" is mapped to "234.54." The concatenated codes represent the one or more dimensions of an OLAP cube and the Data is the data of the intersection of the dimensions of the cube.

In one or more embodiments, the concatenated codes can be stored along with the associated data at each client, where these codes are stored on each of the client devices so that data decoding can be carried out at the client devices themselves. Each client can track which client stores the data corresponding to the code based on the client ID.

In one or more embodiments, each client can use the table 800 to decode the code to retrieve the coded data. In other embodiments, the table 800 can use the short codes to decode the data.

In one or more embodiments, the each of the tables stored at the server and clients in the network can be updated periodically. In other embodiments, the tables can be updated manually. Announcement messages can be broadcast, multicast, or unicast to clients to update the mapping tables and hash tables to maintain a current view of the data available in the network.

Figure 9:
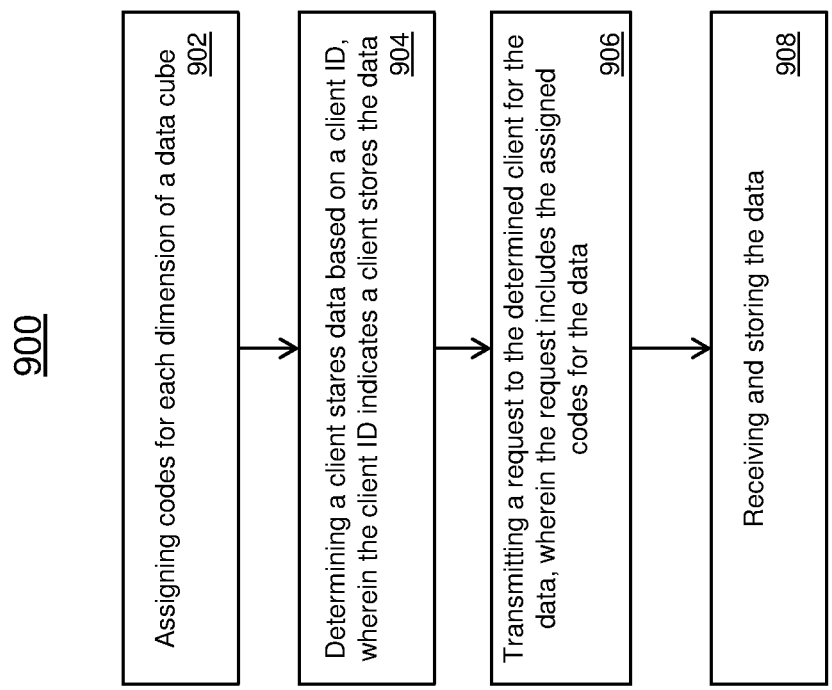
FIG. 9 depicts a flow chart for cache fetching OLAP based data using client to client relationships and data encoding in accordance with one or more embodiments is shown.

Now referring to FIG. 9, a method 900 for implementing cache fetching based on client and data relationships is shown. Block 902 includes assigning codes for each dimension of a data cube. In one or more embodiments, a data cube is analyzed and a code is generated for each element of each dimension. As shown in the example above, a first dimension for the month of January is mapped to "A0," the second dimension for the product Xenophine Betex is mapped to "B0," and a third dimension for the account 12345 is mapped to "C0." In one or more embodiments, the codes can be assigned by a server, a client, and/or other management device.

Block 904 includes determining a client stores data based on a client ID, wherein the client ID indicates the client stores the data. In one or more embodiments, a client wishing to obtain data can determine whether a neighboring client stores the data to be requested by a client ID stored in a dimensional hash table. The client ID indicates which clients store the corresponding data. In the event a client device is not available or indicated in the dimensional hash table, the data can be requested and retrieved from a server. In the event a client device is not available or not indicated in the dimensional hash table, a server request can be sent to the server to retrieve the requested data.

In one or more embodiments, one or more clients can be selected to transmit the data according to clients that are grouped based on a physical proximity to one another. In another embodiment, clients can be selected to transmit the data according to clients that are grouped based on one of being located in a sub-network or virtual address. The grouping of the clients can be used in addition to the client ID to select the client to transmit the encoded data.

Block 906 includes transmitting a request to the determined client for the data, wherein the request includes the assigned codes for the data. In one or more embodiments, one or more codes can be included in a single request. For example, a client can merge the codes in a single request "A0B0C0" which is a query for the data January, Xenophine Betex, and Account 12345. A combination of the codes can be used for requesting data.

Block 908 includes receiving and storing the data. In one or more embodiments, a requesting client receives the requested data and stores the data.

Now referring to FIG. 10, another method 1000 for cache fetching OLAP based data using client and data relationships in accordance with one or more embodiments is provided.

Block 1002 includes transmitting a server request, wherein the server request includes a server hash table ID. In one or more embodiments, the server request is transmitted when the responsive to determining another client does not have the requested data. In an embodiment, it may be determined by referring to the mapping table to check the client ID.

Block 1004 includes retrieving, via the server, data based at least on the server request. In one or more embodiments, data is retrieved from the server because it has been determined that a client in the network contains the data.

Block 1006 includes storing the retrieved data in a cache. Responsive to retrieving the data, the retrieved data is stored in the cache for subsequent access.

Block 1008 includes encoding the retrieved data and transmitting the encoded data and respective code. In one or more embodiments, the retrieved data is encoded into the codes represented the dimensions of the data cube. After the data is encoded, it is transmitted to the client along with a respective code to decode the data.

Block 1010 includes receiving the data, wherein the data is encoded. In one or more embodiments, the encoded data is received and stored at the client.

Block 1012 includes updating the client ID associated with the encoded data and corresponding codes. After the data is received, the client ID is updated and stored in the mapping table to indicate the client stores the data. In one or more embodiments, an announcement message can be transmitted to the network to update the mapping tables stored at other clients.

The techniques described herein improve over the prior art by reducing the amount of data that is transferred in the network between servers and clients by maintaining information on client relationships using codes to decoding of the received information.

In addition, the efficient transfer of data increases the resources and server availability to handle other processes in the network by providing a technique for caching data and executing peer to peer data transfers.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for implementing cache fetching online analytical processing (OLAP) based data using client to client relationships and data encoding, the computer-implemented method comprising:
    assigning codes for each dimension of a data cube;
    determining a client stores data corresponding to the data cube based on a client ID, wherein the client ID indicates the client stores the data;
    transmitting a request to the determined client for the data, wherein the request includes one or more assigned codes for the data;
    receiving and storing the data;
    wherein a combination of assigned codes exceed a threshold number of requests, mapping the combination of assigned codes to a short code; and
    storing the short code in a separate frequently used table.

2. The computer-implemented method of claim 1, wherein mapping tables store cube information, page information, server hash table ID, and a client ID.

3. The computer-implemented method of claim 2, wherein the mapping tables are stored on at least one of a server or client.

4. The computer-implemented method of claim 2, wherein the page information includes details of the dimensions, elements, rows, and columns of the data cube.

5. The computer-implemented method of claim 2, further comprises:
    transmitting a server request, wherein the server request includes a server hash table ID;
    retrieving, via the server, data based at least on the server request;
    storing the retrieved data in a cache;
    encoding the retrieved data and transmitting the encoded data and respective codes;
    receiving the encoded data and the respective codes; and
    updating the client ID associated with the encoded data and the respective codes.

6. The computer-implemented method of claim 5, wherein the server request includes the page information.

7. The computer-implemented method of claim 5, wherein the server request is transmitted responsive to a threshold number of misses.

8. The computer-implemented method of claim 1, further comprises concatenating the assigned codes for each dimension to produce a concatenated code used in the request.

9. The computer-implemented method of claim 1, converting the concatenated code into a short code, wherein a length of the short code is shorter than a length of the concatenated code; and
    storing the short code in a frequently used table.

10. The computer-implemented method of claim 1, wherein one or more clients are grouped based on a physical proximity to one another.

11. The computer-implemented method of claim 1, wherein one or more clients are grouped based on one of a sub-network or virtual address.

12. A system for implementing cache fetching online analytical processing (OLAP) based data using client to client relationships and data encoding, the system comprising:
    a storage medium, the storage medium being coupled to a processor;
    the processor configured to:
        assign codes for each dimension of a data cube;
        determine a client stores data corresponding to the data cube based on a client ID, wherein the client ID indicates the client stores the data;
        transmit a request to the determined client for the data, wherein the request includes one or more assigned codes for the data;
        receive and storing the data;
        wherein mapping tables store cube information, page information, server hash table ID, and a client ID;
        concatenate the assigned codes for each dimension to produce a concatenated code used in the request;
        convert the concatenated code into a short code, wherein a length of the short code is shorter than a length of the concatenated code; and
        store the short code in a separate frequently used table.

13. The system of claim 12, wherein the processor is further configured to:
- transmit a server request, wherein the server request includes a server hash table ID;
- retrieve, via the server, data based at least on the server request;
- store the retrieved data in a cache;
- encode the retrieved data and transmit the encoded data and respective codes;
- receive the encoded data and the respective codes; and
- update the client ID associated with the encoded data and the respective codes.

14. A non-transitory computer program product for cache fetching online analytical processing (OLAP) based data using client to client relationships and data encoding, the computer program product comprising:
- a computer readable storage medium having stored thereon first program instructions executable by a processor to cause the processor to:
  - assign codes for each dimension of a data cube;
  - determine a client stores data corresponding to the data cube based on a client ID, wherein the client ID indicates the client stores the data;
  - transmit a request to the determined client for the data, wherein the request includes one or more assigned codes for the data;
  - receive and storing the data;
  - wherein mapping tables store cube information, page information, server hash table ID, and a client ID;
  - concatenate the assigned codes for each dimension to produce a concatenated code used in the request;
  - convert the concatenated code into a short code, wherein a length of the short code is shorter than a length of the concatenated code; and
  - store the short code in a separate frequently used table.

15. The computer program product of claim 14, wherein the instructions are further executable by the processor to cause the processor to:
- transmit a server request, wherein the server request includes a server hash table ID;
- retrieve, via the server, data based at least on the server request;
- store the retrieved data in a cache;
- encode the retrieved data and transmit the encoded data and respective codes;
- receive the encoded data and the respective codes; and
- update the client ID associated with the encoded data and the respective codes.

* * * * *